June 5, 1945. H. F. WATERS 2,377,531
WHEEL
Filed May 16, 1942 3 Sheets-Sheet 1

INVENTOR.
Harry F. Waters,
BY
Frederick A. Norton

June 5, 1945.  H. F. WATERS  2,377,531
WHEEL
Filed May 16, 1942   3 Sheets-Sheet 2
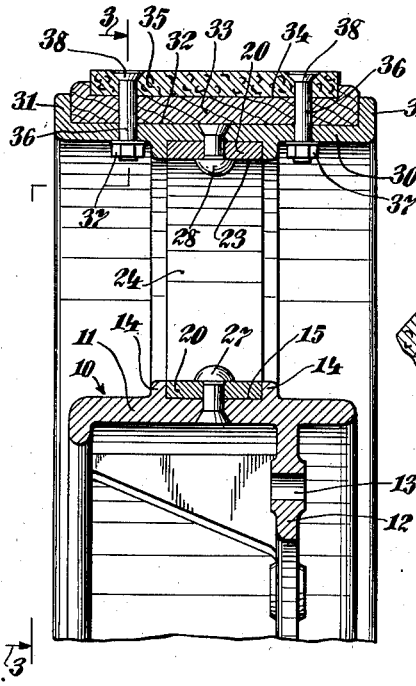
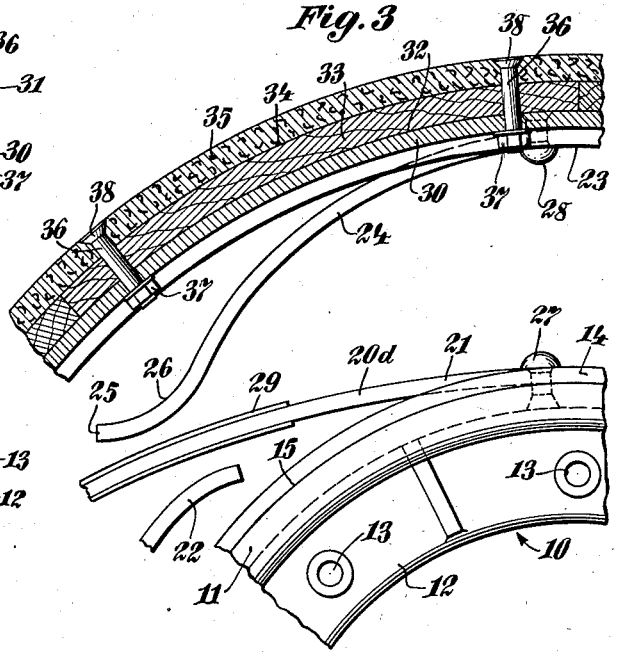
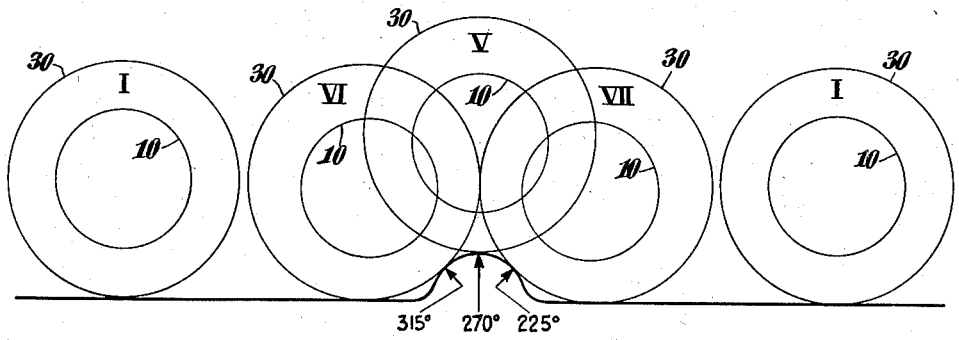
INVENTOR.
Harry F. Waters,
BY
Frederick A. Norton

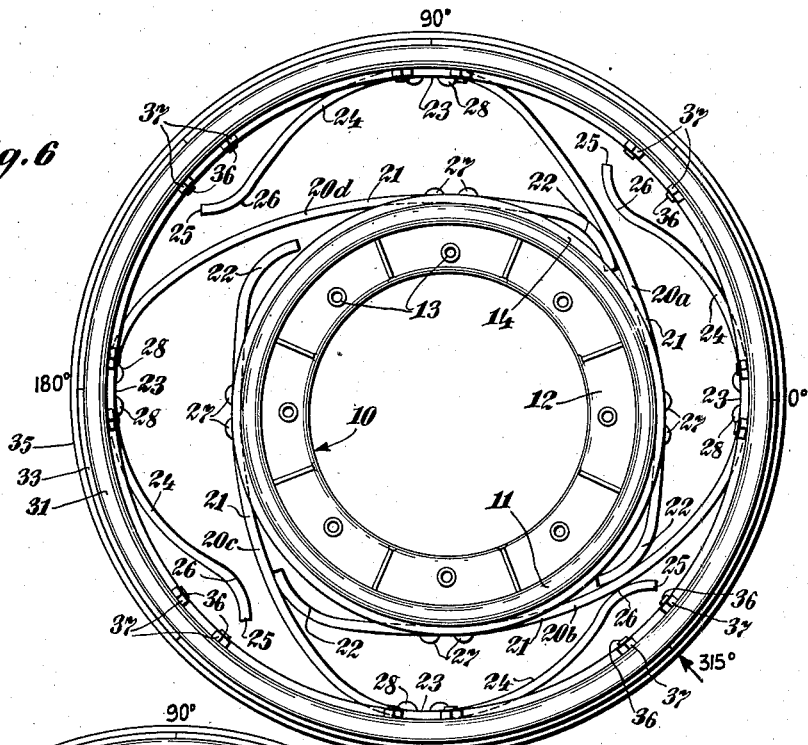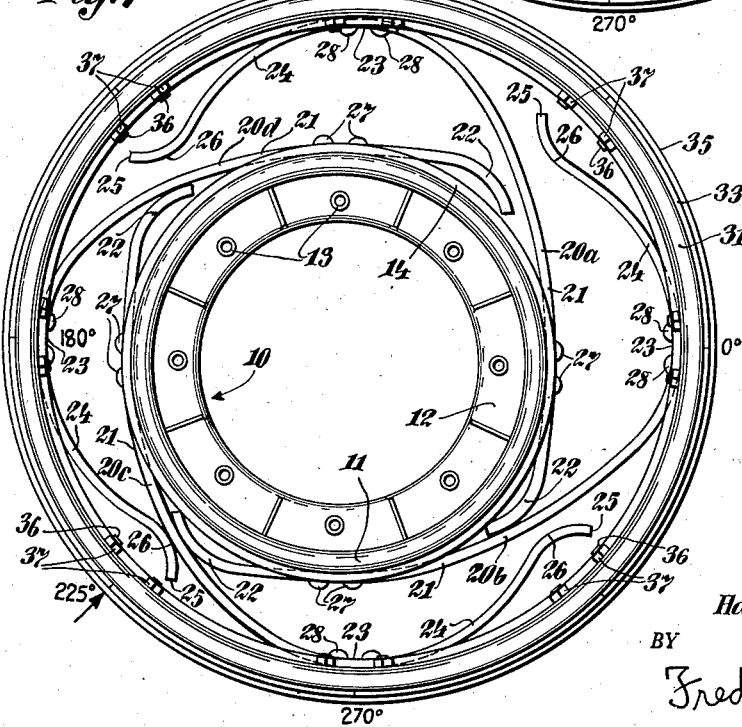

Patented June 5, 1945

2,377,531

UNITED STATES PATENT OFFICE 2,377,531

WHEEL

Harry F. Waters, New York, N. Y.

Application May 16, 1942, Serial No. 443,289

8 Claims. (Cl. 152—69)

This invention relates to improvements in wheels, and, more particularly, to spring-actuated tires or supports for tread surfaces of wheels generally.

In vehicles for transportation, shocks due to impact, under the influence of various loads, and different speeds of travel, have been compensated for or taken up by resilient tires on the wheels of various vehicles. Resilient tires were particularly suitable for use with vehicles which experienced an appreciable amount of torque or twist about the rotative axis. Where resilient tire materials have not been available, and, in fact, before they were commercially developed, attempts had been made to form the spokes as resilient spring members. All of these features were in addition to the conventional use of leaf springs connecting the chassis or body of a wagon to the axles.

It has now been found that mechanical spring members can be arranged and incorporated in tire structures to make use of torque generated in rotating wheels by applied force or the application of braking pressures. The novel arrangement includes a balanced series of symmetrically disposed spring members of generally J-shape, having the long arms or legs secured to the wheel frame, and the bottom, or arc of the same, secured to the tire member, or outer rim. The terminal ends of the J are preferably curved in a common direction, with the end of the long leg extending inwardly of the J, and the end of the short leg extending outwardly thereof.

The balancing of forces and the symmetrical arrangement of the spring members under conditions such that increasing load causes the application or bringing into play of increasing number of spring segments, will be described more in detail hereinafter, and with particular reference to the drawings in which a certain preferred embodiment is shown by way of example only, for, since the underlying principles may be embodied in other structural designs, it is not intended to be limited to the ones here shown except as such limitations are clearly imposed by the appended claims.

In the drawings, like numerals refer to similar parts throughout the several views, of which Fig. 1 is a side view of a wheel of the present invention;

Fig. 2 is a vertical section taken through the wheel on line 2—2 of Fig. 1;

Fig. 3 is a transverse section through the tread and outer rim of the wheel as taken on line 3—3 of Fig. 2;

Fig. 4 is a diagrammatic view showing the wheel of Fig. 1 in four positions, while rolling freely, and against and over an obstruction, and Figs. 5, 6 and 7 are, respectively, views similar to Fig. 1 with load applied directly downward, at an angle of 315°, and at an angle of 225°.

Figure 1:
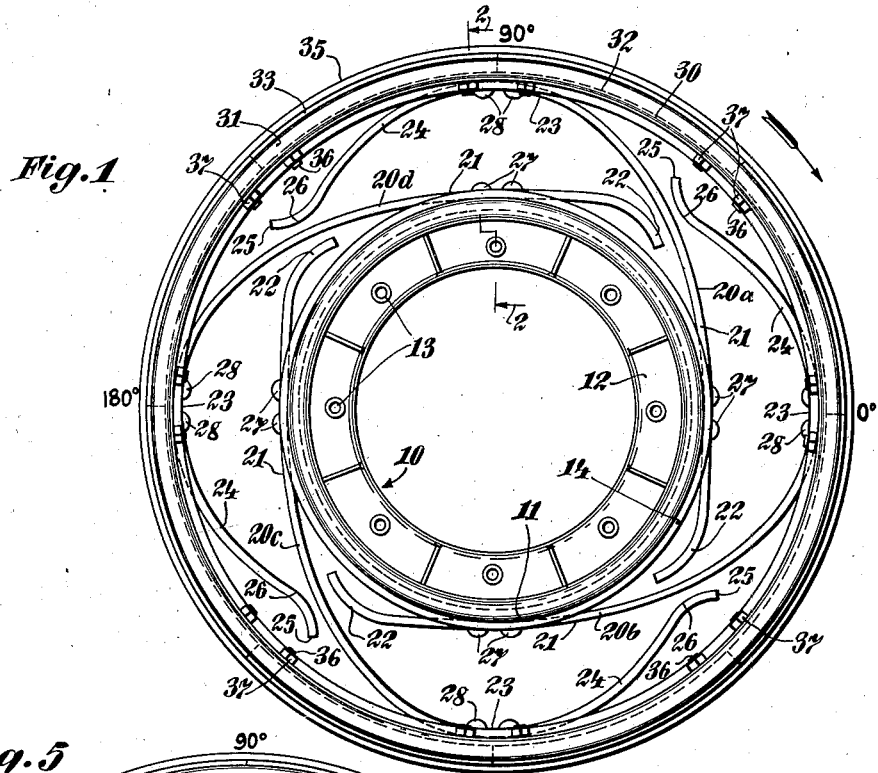

Referring now more particularly to the drawings, the wheel comprises a wheel rim or wheel proper 10, having a beaded flange 11 at one side, and a flange plate 12, having apertures 13, set in from the other side. The flange plate 12 is adapted to be secured onto a hub or axle, not shown. The rim 10 is provided on its exterior surface or circumference with a pair of spaced ribs 14, defining an aligning groove 15 adapted to receive spring members 20, as will be described more in detail hereinafter. The spring members 20 are of generally J-shape and comprise a long arm or leg 21, terminating in an inturned, arcuate tip 22, a bottom arc portion 23, and a short curvilinear leg 24 which terminates in an everted, arcuate tip 25, having a curvilinear bearing surface or section 26. The springs 20 are secured to the wheel rim 10 by rivets 27 extending through the rim. The rivets may be of any suitable size or dimension and secure the J-springs at the upper portions of the long arms 21. The centers of the bottom arc 23 of the J-spring 20 are secured to outer rims 30 by rivets 28.

The outer rims 30 comprise an annular member having everted edge flanges 31 defining a peripheral groove 32 in which is set a filler member 33 having a peripheral groove 34 adapted to receive a tread section 35. The filler member 33 may be made up of a plurality of segments, as may the tread member 35. The tread and supporting filler sections are secured to the outer rim 30 by bolts 36 and nuts 37, the heads of the bolts being countersunk in the tread, as indicated at 38. The tread material may be of rubber, reclaimed and loaded with strengthening materials such as cotton fibers and other ingredients, including asbestos. The tread material may also be comprised of asphalt-base compositions, either polymerized, or not, to give tough, wear-resisting facings. The filler members 33 can desirably be of wood. To prevent undue wear on the shanks 21 of J-springs 20, where they are contacted by snubber sections 26 of cooperating springs, the shanks may be provided with wear-resisting facings 29, as indicated in Fig. 3. The wear-resisting facings 29 may be made of brake lining material, or the like.

Referring now to Fig. 1, it will be seen that the illustrated modification includes four J-springs quadrantly mounted between the wheel rim and the outer rim. For purposes of convenience, the several spring members are respectively designated as 20a, 20b, 20c, and 20d. The relationship of the springs and their coacting parts can be seen from the following tabular representation of the positions shown in Fig. 1, it being noted that the legs 21 of the several springs are attached only to the inner rim or wheel 10 while the bottom arc section 23 of the springs are attached only to the outer rim 30. The angular relations are given conventionally, i. e., reading counterclockwise.

*Position on wheel in degrees*

|  | Bend 23 attached to outer rim | Leg 21 attached to wheel rim |
| --- | --- | --- |
|  | Degrees | Degrees |
| 20a | 90 | 0 |
| 20b | 0 | 270 |
| 20c | 270 | 180 |
| 20d | 180 | 90 |

The foregoing table is based on a quadrantal arrangement of the spring members, and upon the use of steel springs. Where wooden springs may be used, the angular displacement between the legs 21 and arcs 23 may be increased. Conversely, where greater tension is desired, the angular displacement may be reduced below 90°. It is to be noted further, that while a quadrantal arrangement of springs has been described, the number of springs need not be limited, and the invention comprehends the use of any desired number, including 5, 6, or more springs, all equidistant and uniformly spaced. Where an increased number of springs is used, the strength of each individual spring can be correspondingly reduced. Thus, springs used in a six-spring arrangement, can be individually weaker than those used in a five-spring or a four-spring arrangement.

Referring now to Fig. 4, there is shown diagrammatically the position diagram of the wheels in various positions. In the position designated by I, the wheels are in the state of rest or neutral condition, indicated in Fig. 1. Here it will be seen that the snubber sections 22 and 26 of the springs 20 are spaced from the interposed leg sections 21 of the intervening spring members. Considering this figure further, that is Fig. 1, it will be noted that the alternate springs have the tips of the short leg of one adjacent the tip of the long leg of the other, with the lower segment of the long leg of an intervening spring therebetween. When the wheel advances to the VI position, shown in Fig. 4, the wheel will assume the position shown in detail in Fig. 6. Here the angle of impact is at 315°, and the axis of the wheel is shifted forwardly and downwardly from the axis of the outer rim. The cooperating spring sections 22 and 26 of springs 20a and 20c will be forced against the lower section of leg 21 of spring 20b, giving, in effect, the action of a 3-leaf spring. At the same time end 25 of spring 20b will be snubbed against section 21 of spring 20c while section 22 of spring 20d will act as a snubber for the lower section 21 of spring 20a. Thus, it will be seen, that the spring snubbing force, while applied in opposition to the direct impact or thrust in the 315° position, or point of impact, will also be taken up at diametrically opposed points on either side of the axis of thrust, and substantially normal thereto, so as to effect an operative balance.

Figure 5:
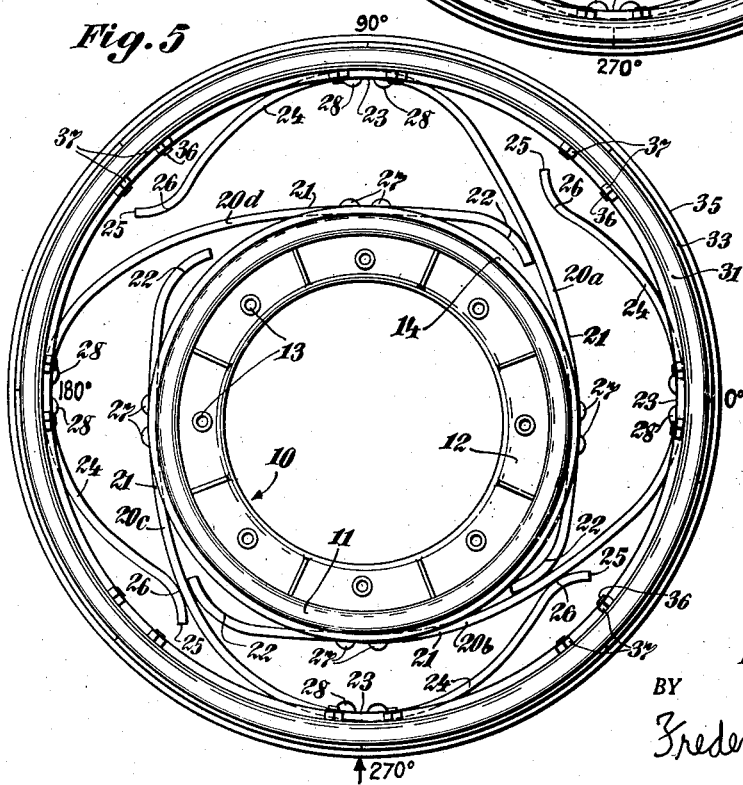

When the wheel advances to the V-position in Fig. 4, the condition shown in Fig. 5 will obtain. Here the thrust is directly upward, and the inner rim or wheel is supported by spring section 21 of spring 20b, fulcrumed between the two legs of spring 20c, while the downward weight applied to wheel 10 causes spring 20a to be engaged and snubbed by section 22 of spring 20d. Here again it will be observed that all the springs in the wheel are brought into action.

When the wheel advances to VII-position of Fig. 4, just as the obstruction is being cleared, the angle of impact will be on the 225° line shown in Fig. 7. Here, the main impact is borne by the opposed action of springs 20b and 20c, mutually snubbing each other, with section 26 of spring 20d reinforcing the snubbing action. This snubbing action is balanced laterally by the action of sections 22 of springs 20c and 20a on legs 21 of springs 20d and 20b. Here it will be noted, as in the other cases, that the direct thrust is taken by 3-leaf sections, and the lateral, normal thrusts by 2-leaf sections.

Upon further rolling, as indicated in Fig. 4, these wheels will assume the normal unstressed conditions, characteristic of Fig. 1.

Referring again to Fig. 1, it will be noted that the terminal ends 22, 25, of the springs, and the central portions of legs 21, are concentric with the wheel and its outer rim. It will be noted further that in Fig. 1, which is a normal load-carrying or neutral position, the load is carried directly by the arc or section 21 of the spring between the points of fastening, 23 and 27. Upon distortion of the springs 21 to one side or the other of the neutral circle, they are promptly and effectively snubbed, and, on the application of any torque, the snubbing action is increased in a ratio directly proportional to the amount of force developed, so that with increasing distortive forces the tendency to return to the normal, balanced condition is correspondingly increased. This effects a substantially automatic balance in the wheel construction.

From the foregoing, it will be observed that during the rotative movement of the wheel, under impact, the distortive forces are balanced and rotatively supported directly in the line or angle of impact, and buttressed or laterally supported at both sides of the axis, in opposed directions normal to the line of impact. This remarkable feature is rendered possible by the use of spaced spring members in suitable numbers, having main spring sections cooperatively snubbed and supported by tip sections of alternate springs, in direct action, while lateral support is provided by the circumferentially disposed springs mutually engaging each other under the impact and control of the springs which are primarily impacted or engaged.

What is claimed is:

1. In a wheel construction, a central wheel section and an outer rim section, and a plurality of equi-spaced J-shaped spring spoke members having free ends and being secured to and between the said central and rim wheel sections, and tangentially thereof intermediate their said free ends, the tangential points of attachment of the several spokes being angularly displaced between the wheel and the rim section.

2. In a wheel construction, a central wheel section and an outer rim section, and a plurality of equi-spaced J-shaped spring spoke members having free ends and being secured to and between the said central and rim wheel sections, and tangentially thereof intermediate their said free ends, the spokes being curvilinear springs tangentially secured to the wheel and the rim in unaligned radial displacement.

3. A two-part wheel construction, comprising an inner wheel body and an outer rim section, flat curvilinear spokes secured inwardly of their ends tangentially to the said wheel body and the rim in predetermined angularly spaced relation, the point of attachment of a spring to the wheel section being in radial alignment with the point of attachment of the next succeeding spring to the rim member.

4. A wheel construction comprising an inner wheel section and an outer rim section joined by torque-resisting spokes, said spokes comprising flat, J-shaped springs having unidirectional curved ends, the long arms of the springs being secured to the inner sections of the wheels, and the bottoms of the J's to the rims of the wheels, a plurality of said members in a given wheel construction being so disposed as to place the curved terminal ends of the members in alternate juxtaposition to intermediate members.

5. A wheel construction comprising an inner wheel section and an outer rim section joined by torque-resisting spokes, said spokes comprising flat, J-shaped springs having unidirectional curved ends, the long arms of the springs being secured to the inner sections of the wheels, and the bottoms of the J's to the rims of the wheels, a plurality of said members in a given wheel construction being so disposed as to place the curved terminal ends of the members in alternate juxtaposition to intermediate members, the shanks of the intermediate members being provided with abrasion resistant surfacings.

6. A composite wheel comprising an annular body section, and an outer rim having a tread section, spokes joining the two sections; the said spokes comprising J-shaped members of flat spring material having free ends and having the long arm of the J secured to the body section and the bottom of the J secured to the rim.

7. A composite wheel comprising an annular body section, and an outer rim having a tread section, spokes joining the two sections; the said spokes comprising J-shaped members of flat spring material having the long arm of the J secured to the wheel and the bottom of the J secured to the rim, the said wheel sections having annular grooves in which the sections of the spokes adjacent their respective ends are fitted and secured.

8. A two-part wheel construction, comprising an inner wheel body and an outer rim section, grooves on the body and rim, flat curvilinear spokes having the portions adjacent their ends seated in the grooves and secured tangentially to the wheel body and rim in predetermined, angularly spaced relation, the point of attachment of a spring to the wheel section being in radial alignment with the point of attachment of the next succeeding spring to the rim member.

HARRY F. WATERS.